United States Patent
Kataishi et al.

(10) Patent No.: US 12,441,924 B2
(45) Date of Patent: Oct. 14, 2025

(54) THERMALLY-CONDUCTIVE SILICONE GEL COMPOSITION, THERMALLY-CONDUCTIVE SILICONE GEL SHEET, AND METHOD FOR PRODUCING SAME

(71) Applicant: Fuji Polymer Industries Co., Ltd., Nagoya (JP)

(72) Inventors: Takumi Kataishi, Aichi (JP); Mai Sugie, Aichi (JP); Yuko Kimura, Aichi (JP)

(73) Assignee: Fuji Polymer Industries Co., Ltd., Aichi (JP)

( * ) Notice: Subject to any disclaimer, the term of this patent is extended or adjusted under 35 U.S.C. 154(b) by 839 days.

(21) Appl. No.: 17/772,073

(22) PCT Filed: Mar. 26, 2021

(86) PCT No.: PCT/JP2021/012921
§ 371 (c)(1),
(2) Date: Apr. 26, 2022

(87) PCT Pub. No.: WO2022/009486
PCT Pub. Date: Jan. 13, 2022

(65) Prior Publication Data
US 2022/0380653 A1    Dec. 1, 2022

(30) Foreign Application Priority Data
Jul. 7, 2020 (JP) ................................. 2020-117285

(51) Int. Cl.
*C09K 5/14* (2006.01)
*C08G 77/08* (2006.01)
(Continued)

(52) U.S. Cl.
CPC ................ *C09K 5/14* (2013.01); *C08G 77/08* (2013.01); *C08G 77/12* (2013.01); *C08G 77/20* (2013.01);
(Continued)

(58) Field of Classification Search
CPC ... C09K 5/14; C08K 3/022; C08K 2003/2227
See application file for complete search history.

(56) References Cited

U.S. PATENT DOCUMENTS

2004/0254275 A1   12/2004   Fukui et al.
2010/0140538 A1*   6/2010   Sekiba .................... C08L 83/04
                                                                     252/78.3
(Continued)

FOREIGN PATENT DOCUMENTS

CN   104136569 A   11/2014
EP   0 799 693   10/1997
(Continued)

OTHER PUBLICATIONS

Office Action issued in the corresponding Taiwanese application, Jun. 21, 2024 (5 pages).
(Continued)

*Primary Examiner* — Matthew R Diaz
(74) *Attorney, Agent, or Firm* — HSML P.C.

(57) ABSTRACT

A thermally-conductive silicone gel composition of the present invention contains A to D components below. A: a linear organopolysiloxane having one vinyl group at each terminal end of a molecular chain and a kinematic viscosity of 1 to 600 mm$^2$/s, B: a linear organopolysiloxane having three or more Si—H groups in one molecule and an Si—H group content of 0.05 to 6 mol/kg, in an amount such that a ratio of the number of Si—H groups in B component to the number of vinyl groups in A component is 0.2 to 0.5, C: a platinum catalyst in a catalytic amount, and D: a thermally-
(Continued)

conductive filler in an amount of 300 to 1000 parts by mass when a total amount of A and B is taken as 100 parts by mass.

10 Claims, 1 Drawing Sheet

(51) Int. Cl.
    *C08G 77/12*     (2006.01)
    *C08G 77/20*     (2006.01)
    *C08J 5/18*     (2006.01)
    *C08K 3/22*     (2006.01)
    *C08K 7/18*     (2006.01)

(52) U.S. Cl.
    CPC .................. *C08J 5/18* (2013.01); *C08K 7/18* (2013.01); *C08J 2383/05* (2013.01); *C08J 2383/07* (2013.01); *C08K 2201/001* (2013.01); *C08K 2201/005* (2013.01)

(56) References Cited

U.S. PATENT DOCUMENTS

| | | |
|---|---|---|
| 2015/0008361 A1 | 1/2015 | Hattori |
| 2019/0177584 A1* | 6/2019 | Gubbels .................. C08L 83/04 |
| 2020/0239758 A1* | 7/2020 | Ota .......................... C08L 83/04 |
| 2021/0017437 A1 | 1/2021 | Suzumura |

FOREIGN PATENT DOCUMENTS

| | | | |
|---|---|---|---|
| JP | 9-207275 | 8/1997 | |
| JP | 11-121953 | 4/1999 | |
| JP | 2000-026733 | 1/2000 | |
| JP | 3558527 B2 * | 8/2004 | |
| JP | 2004323764 A * | 11/2004 | |
| JP | 2011-016923 | 1/2011 | |
| JP | 2011089079 A * | 5/2011 | |
| JP | 2016-011322 | 1/2016 | |
| TW | 201908459 A | 3/2019 | |
| WO | 02/092693 | 11/2002 | |
| WO | 2013/129600 | 9/2013 | |
| WO | 2019/021824 | 1/2019 | |
| WO | WO-2019021824 A1 * | 1/2019 | ............. C08G 77/12 |
| WO | 2020/137086 | 7/2020 | |

OTHER PUBLICATIONS

International Search Report issued in International Application No. PCT/JP2021/012921, Jun. 15, 2021, 6 pages w/ translation.

* cited by examiner

THERMALLY-CONDUCTIVE SILICONE GEL COMPOSITION, THERMALLY-CONDUCTIVE SILICONE GEL SHEET, AND METHOD FOR PRODUCING SAME

TECHNICAL FIELD

The present invention relates to a thermally-conductive silicone gel composition and a thermally-conductive silicone gel sheet that are suitably interposed between a heat generating portion and a heat dissipating member in an electric/electronic component or the like, and a method for producing the same.

BACKGROUND ART

In recent years, the performance of semiconductors such as CPUs has been remarkably improved, and the amount of heat generated has also significantly increased. A heat dissipating member is attached to an electronic component such as a semiconductor that generates heat, and a thermally-conductive silicone gel sheet is used to improve the close contact between the semiconductor and the heat dissipating member. A conventional thermally-conductive silicone cured product is problematic in that the proportion of a silicone polymer as the matrix resin is reduced by filling with thermally-conductive fillers, and the resilience desired for the silicone polymer is impaired. Patent Documents 1 and 2 propose a thermally-conductive silicone gel sheet made of a specific organopolysiloxane containing an alkenyl group bonded to a non-terminal silicon atom. Patent Document 3 proposes a heat dissipating spacer made of a cured silicone containing a silica-coated aluminum nitride powder.

CITATION LIST

Patent Documents

Patent Document 1: JP 2016-11322A
Patent Document 2: JP 2011-16923A
Patent Document 3: JP H11-121953A

DISCLOSURE OF INVENTION

Problem to be Solved by the Invention

However, conventional thermally-conductive silicone gel sheets have a problem in satisfying the contradictory properties of flexibility and high resilience.

In order to solve the above-described conventional problem, the present invention provides a thermally-conductive silicone gel composition and a thermally-conductive silicone gel sheet that satisfy the contradictory properties of flexibility and high resilience, and a method for producing the same.

Means for Solving Problem

The present invention is directed to a thermally-conductive silicone gel composition containing:
A a linear organopolysiloxane having one vinyl group at each terminal end of a molecular chain and a kinematic viscosity of 1 to 600 mm$^2$/s;
B a linear organopolysiloxane having three or more Si—H groups in one molecule and an Si—H group content of 0.05 to 6 mol/kg, in an amount such that a ratio of the number of Si—H groups in B component to the number of vinyl groups in A component is 0.2 to 0.5;
C a platinum group metal-based catalyst in a catalytic amount; and
D a thermally-conductive filler in an amount of 300 to 1000 parts by mass when a total amount of A and B is taken as 100 parts by mass, including
D1 50 to 400 parts by mass of at least one type of spherical alumina with an average particle size of 1 to 5 μm, a part or a whole of the alumina being surface-treated with R$_a$Si(OR')$_{4-a}$ (where R represents an unsubstituted or substituted organic group having 8 to 12 carbon atoms, R' represents an alkyl group having 1 to 4 carbon atoms, and a is 0 or 1), and
D2 100 to 950 parts by mass of at least one type of spherical alumina with an average particle size of 10 to 100 μm.

Also, the present invention is directed to a thermally-conductive silicone gel sheet obtained by curing the above-described composition, the sheet having a thermal conductivity of 1 W/m·K or more, an Asker C hardness of 30 or less, and a resilience rate of 20% or more.

Also, the present invention is directed to a method for producing the thermally-conductive silicone gel sheet, including uniformly mixing a composition containing the above-described A to D components, forming the mixture into a sheet, and curing the sheet by heat.

Effects of the Invention

According to the present invention, it is possible to provide a thermally-conductive silicone gel composition and a thermally-conductive silicone gel sheet that can realize both of the contradictory properties of flexibility and high resilience, and a method for producing the same.

DESCRIPTION OF THE INVENTION

Figure 1A:
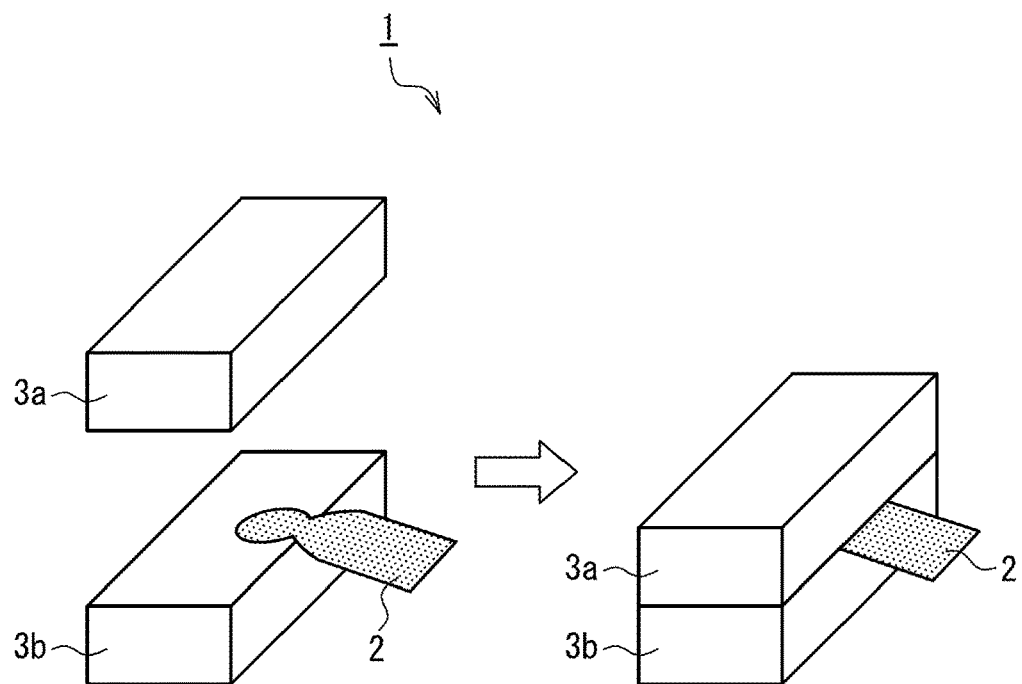
FIGS. 1A and 1B are explanatory diagrams showing a method for measuring the thermal conductivity of a sample according to an embodiment of the present invention.

The thermally-conductive silicone gel composition of the present invention contains A to D below:
A a linear organopolysiloxane having one vinyl group at each terminal end of a molecular chain and a kinematic viscosity of 1 to 600 mm$^2$/s;
B a linear organopolysiloxane having three or more Si—H groups in one molecule and an Si—H group content of 0.05 to 6 mol/kg, in an amount such that a ratio of the number of Si—H groups in B component to the number of vinyl groups in A component is 0.2 to 0.5;
C a platinum group metal-based catalyst in a catalytic amount and
D a thermally-conductive filler in an amount of 300 to 1000 parts by mass when a total amount of A and B is taken as 100 parts by mass, including
D1 50 to 400 parts by mass of at least one type of spherical alumina with an average particle size of 1 to 5 μm, a part or a whole of the alumina being surface-treated with a silane coupling agent represented by R$_a$Si(OR')$_{4-a}$ (where R represents an unsubstituted or substituted organic group having 8 to 12 carbon atoms, R' represents an alkyl group having 1 to 4 carbon atoms, and a is 0 or 1), and D2 100 to 950 parts by mass of at least one type of spherical alumina with an average particle size of 10 to 100 μm.

The thermally-conductive silicone gel composition of the present invention is a composition containing the above-described A to D components, and thus it can realize both of the contradictory properties of flexibility and high resilience. That is to say, the A component has a kinematic viscosity of 1 to 600 mm$^2$/s, and the B component has an Si—H group content of 0.05 to 6 mol/kg, and thus, when the A component and the B component are blended in an amount such that a ratio of the number of Si—H groups in the B component to the number of vinyl groups in the A component (the number of Si—H groups in the B component/the number of vinyl groups in the A component) is 0.2 to 0.5, the crosslink density after curing is optimized, and flexibility and high resilience can be realized.

If the kinematic viscosity of the A component is higher than the above-mentioned range, the distance between the cross-linking points becomes long and the resilience is lowered, and, if the kinematic viscosity is lower than the above-mentioned range, the distance between the cross-linking points becomes short and the flexibility is impaired.

If the Si—H group content of the B component is within the above-mentioned range, there is an advantage in that the hardness can be easily adjusted and the resilience of the cured product tends to be improved. If the content is lower than the above-mentioned range, the resilience rate is likely to deteriorate, and, if the content is higher than the above-mentioned range, the hardness is increased merely by adding a small amount of the B component, and a flexible cured product cannot be obtained.

Furthermore, it is possible to realize flexibility and high resilience, by adding a specific thermally-conductive filler.

The thermally-conductive silicone gel sheet of the present invention is a sheet obtained by curing a composition containing the above-described A to D components, and thus it can realize both of the contradictory properties of flexibility and high resilience. That is to say, the sheet has a thermal conductivity of 1 W/m·K or more, an Asker C hardness of 30 or less, and a resilience rate of 20% or more, that is, it is flexible and high resilient. The production method of the present invention makes it possible to efficiently, rationally, and inexpensively produce the thermally-conductive silicone gel sheet.

The A component is preferably a linear organopolysiloxane having one vinyl group at each terminal end of the molecular chain, and having an organic group such as an alkyl group or a phenyl group, or a combination thereof as a side chain. Note that the linear organopolysiloxane may contain a small amount of branched structure (trifunctional siloxane unit) in the molecule. Examples of the A component include a compound having a dimethylvinylsiloxy group at, at least, each terminal end, and including dimethylpolysiloxane as a main chain. The kinematic viscosity is 1 to 600 mm$^2$/s, more preferably 50 to 550 mm$^2$/s, and even more preferably 100 to 500 mm$^2$/s. The kinematic viscosity is shown in a manufacturer's catalog or the like, and is a kinematic viscosity at 25° C. measured using an Ubbelohde viscometer. The A component has a kinematic viscosity of 1 to 600 mm$^2$/s, and the B component has an Si—H group content of 0.05 to 6 mol/kg, and thus, when the A component and the B component are blended in an amount such that the ratio of the number of Si—H groups in the B component to the number of vinyl groups in the A component (the number of Si—H groups in the B component/the number of vinyl groups in the A component) is 0.2 to 0.5, the crosslink density after curing is optimized, and flexibility and high resilience can be realized.

Specific examples of the A component include a dimethylpolysiloxane having each terminal end of the molecular chain capped with a dimethylvinylsiloxy group, a dimethylpolysiloxane having each terminal end of the molecular chain capped with a methylphenylvinylsiloxy group, a dimethylsiloxane-methylphenylsiloxane copolymer having each terminal end of the molecular chain capped with a dimethylvinylsiloxy group, a dimethylsiloxane-methylvinylsiloxane copolymer having each terminal end of the molecular chain capped with a dimethylvinylsiloxy group, and a methyl(3,3,3-trifluoropropyl)polysiloxane having each terminal end of the molecular chain capped with a dimethylvinylsiloxy group. They can be used alone or in a combination of two or more.

The B component is an organohydrogenpolysiloxane having three or more Si—H groups in one molecule. The organohydrogenpolysiloxane functions as a cross-linking agent that causes an addition reaction with an A component having an alkenyl group. If the number of Si—H groups in one molecule is less than three, the B component does not have a three-dimensional crosslinked structure and does not function as the cross-linking agent. Furthermore, the linear organopolysiloxane has an Si—H group content of 0.05 to 6 mol/kg, more preferably 0.05 to 5 mol/kg, and even more preferably 0.05 to 2 mol/kg. If the Si—H group content is within the above-mentioned range, there is an advantage in that the hardness can be easily adjusted and the resilience of the cured product tends to be improved. If the content is lower than the above-mentioned range, the resilience rate is likely to deteriorate, and, if the content is higher than the above-mentioned range, the hardness is increased merely by adding a small amount of the B component, and a flexible cured product cannot be obtained. The ratio of the number of Si—H groups in the B component to the number of vinyl groups in the A component (the number of Si—H groups in the B component/the number of vinyl groups in the A component) is 0.2 to 0.5, more preferably 0.25 to 0.45, and even more preferably 0.3 to 0.4. The organic groups of the B component other than the Si—H groups is preferably an alkyl group, a phenyl group, or a combination thereof. Note that the linear organopolysiloxane may contain a small amount of branched structure (trifunctional siloxane unit) in the molecule. Examples of the organic group other than the Si—H groups include a dimethyl group. Specific examples of the B component include a dimethylsiloxane-methylhydrogensiloxane copolymer having each terminal end of the molecular chain capped with a trimethylsiloxy group, a dimethylsiloxane-methylhydrogensiloxane-methylphenylsiloxane copolymer having each terminal end of the molecular chain capped with a trimethylsiloxy group, a dimethylsiloxane-methylhydrogensiloxane copolymer having each terminal end of the molecular chain capped with a dimethylhydrogensiloxy group, and a methylhydrogensiloxane-methylphenylsiloxane copolymer having each terminal end of the molecular chain capped with a dimethylhydrogensiloxy group. These organohydrogenpolysiloxanes can be used alone or in a combination of two or more.

The linear organopolysiloxane of the B component has a kinematic viscosity of preferably 1 to 10000 mm$^2$/s, more preferably 3 to 9000 mm$^2$/s, even more preferably 3 to 8000 mm$^2$/s, even more preferably 5 to 6000 mm$^2$/s, even more preferably 10 to 3000 mm$^2$/s, and even more preferably 20 to 1000 mm$^2$/s. The kinematic viscosity is shown in a manufacturer's catalog or the like, and is a kinematic viscosity at 25° C. measured using an Ubbelohde viscometer.

The catalyst component of the C component is a component that facilitates curing of the above-described composition. As the C component, a catalyst used for a hydrosilylation reaction can be used. Example of the catalyst include platinum group metal-based catalysts such as platinum-based catalysts, palladium-based catalysts, and rhodium-based catalysts. The platinum-based catalysts include, e.g., platinum black, platinum chloride, chloroplatinic acid, a reaction product of chloroplatinic acid and monohydric alcohol, a complex of chloroplatinic acid and olefin or vinylsiloxane, and platinum bis(acetylacetonato). The C component may be mixed in an amount required for curing. The amount of the C component can be appropriately adjusted in accordance with the desired curing rate or the like. The component C is preferably added at a concentration of 0.01 to 1000 ppm based on the weight of metal atoms with respect to the A component.

The D component is a thermally-conductive filler, and is added in an amount of 300 to 1000 parts by mass when the total amount of A and B is taken as 100 parts by mass. The D component is added in an amount of more preferably 400 to 900 parts by mass, and even more preferably 500 to 800 parts by mass.

The D component includes D1 and D2 below:

D1 50 to 400 parts by mass of at least one type of spherical alumina with an average particle size of 1 to 5 μm, a part or a whole of the alumina being surface-treated with a silane coupling agent represented by $R_aSi(OR')_{4-a}$ (where R represents an unsubstituted or substituted organic group having 8 to 12 carbon atoms, R' represents an alkyl group having 1 to 4 carbon atoms, and a is 0 or 1); and D2 100 to 950 parts by mass of at least one type of spherical alumina with an average particle size of 10 to 100 μm.

When D1 (surface-treated spherical alumina with an average particle size of 1 to 5 μm) and D2 (spherical alumina with an average particle size of 10 to 100 μm) are used in combination, spaces between large particles are filled with small particles, a state close to the most densely filled state can be realized, and thus the thermal conductivity can be increased while the flexibility and the high resilience are maintained. Furthermore, when alumina (aluminum oxide) is used, the production can be performed at low cost. The average particle size is D50 (median size) of the cumulative particle size distribution based on the volume in the particle size distribution measurement by the laser diffraction light scattering method. As a measuring instrument, for example, a laser diffraction/scattering particle size distribution analyzer LA-950S2 manufactured by HORIBA, Ltd. can be used.

Furthermore, from the viewpoint of suppressing consumption due to adsorption of the catalyst component of the C component and realizing the most densely filled state described above, the D2 component is preferably added in an amount of 200 to 500 parts by mass with respect to 100 parts by mass of the D1 component.

The D1 component is spherical alumina a part or the whole of which is surface-treated with the above-described silane coupling agent. The silane coupling agent may be pretreated by being mixed with the spherical alumina in advance, or may be added when the base polymer (the A component and the B component), the curing catalyst (the C component), and the spherical alumina are mixed (integral blend method). In the case of the integral blend method, the silane coupling agent is preferably added in an amount of 0.01 to 10 parts by mass with respect to 100 parts by mass of spherical alumina with an average particle size of 1 to 5 μm. When the surface is treated, the D1 component is easily filled into the base polymer, and the effect of preventing the curing catalyst from being adsorbed to the D1 component, thereby preventing the curing from being inhibited can be obtained. This effect is useful for storage stability. Furthermore, when the surface of spherical alumina that is a thermally-conductive filler is treated with the silane coupling agent, the resilience is improved.

Examples of the silane coupling agent include silane compounds such as octyltrimethoxysilane, octyltriethoxysilane, decyltrimethoxysilane, decyltriethoxysilane, dodecyltrimethoxysilane, and dodecyltriethoxysilane. These silane compounds can be used alone or in a combination of two or more. As the surface treating agent, alkoxysilane and siloxane having silanol at one terminal end or polysiloxane having trimethoxysilyl at one terminal end may be used in combination. The surface treatment herein includes not only covalent bonding but also adsorption.

The spherical alumina of the D2 may include at least two types of alumina including spherical alumina with an average particle size of 10 μm or more and less than 50 μm and spherical alumina with an average particle size of 50 μm or more and 100 μm or less. With this configuration, a state closer to the most densely filled state can be realized.

The D2 component may be surface-treated with a silane compound represented by $R_aSi(OR')_{4-a}$ (R represents an unsubstituted or substituted organic group having 1 to 20 carbon atoms, R' represents an alkyl group having 1 to 4 carbon atoms, and a is 0 or 1), a partial hydrolysate thereof, or an alkoxy group-containing silicone. Examples of the above-mentioned alkoxysilane compound (hereinafter simply referred to as "silane") include silane compounds such as methyltrimethoxysilane, ethyltrimethoxysilane, propyltrimethoxysilane, butyltrimethoxysilane, pentyltrimethoxysilane, hexyltrimethoxysilane, hexyltriethoxysilane, octyltrimethoxysilane, octyltriethoxysilane, decyltrimethoxysilane, decyltriethoxysilane, dodecyltrimethoxysilane, dodecyltriethoxysilane, hexadecyltrimethoxysilane, hexadecyltriethoxysilane, octadecyltrimethoxysilane, and octadecyltriethoxysilane. These silane compounds can be used alone or in a combination of two or more. As the surface treating agent, alkoxysilane and siloxane having silanol at one terminal end may be used in combination. The surface treatment herein includes not only covalent bonding but also adsorption.

The thermally-conductive silicone gel sheet of the present invention has a thermal conductivity of preferably 1 to 5 W/m·K, more preferably 1.2 to 4.5 W/m·K, and even more preferably 1.5 to 4 W/m·K. The thermal conductivity is measured by the hot disc method (as defined in ISO/CD 22007-2), which will be described later.

The thermally-conductive silicone gel sheet of the present invention has an Asker C hardness of preferably 3 to 30, more preferably 5 to 28, and even more preferably 10 to 25. The Asker C hardness is measured according to JIS K 7312.

The thermally-conductive silicone gel sheet of the present invention has a resilience rate of preferably 20 to 100%, more preferably 21 to 100%, and even more preferably 22 to 100%. The resilience rate is measured by a method, which will be described later.

The thermally-conductive silicone gel sheet is preferably such that foaming is not seen by visual observation. If foaming occurs during curing, there is a problem in that the thermal conductivity decreases.

The method for producing a thermally-conductive silicone gel sheet of the present invention includes uniformly mixing a composition containing the above-described A to D components, forming the mixture into a sheet, and curing the sheet by heat. The mixture is formed into a sheet preferably by a method in which the mixture is sandwiched and rolled between polyethylene terephthalate (PET) films. The sheet has a thickness of preferably 0.1 to 5.0 mm. The curing by heat is preferably performed through heat treatment at a temperature of 70 to 150° C. for 10 to 120 minutes.

Components other than those described above may be added to the composition of the present invention as necessary. For example, a heat resistance improver such as red iron oxide, titanium oxide, or cerium oxide, a flame retardant aid, or a curing retarder may be added. Examples of the curing retarder include ethynylcyclohexanol. Organic or inorganic particle pigments may be added for the purpose of coloring and toning.

EXAMPLES

Hereinafter, examples will be described. The present invention is not limited to the examples. Various parameters were measured by the following methods.

<Hardness>

An Asker C hardness as defined in JIS K 7312 was measured.

<Resilience Rate>

The resilience rate was measured as follows: a silicone gel sheet with a length of 20 mm, a width of 20 mm, and a thickness of 3 mm was sandwiched between polyimide films with a thickness of 12 μm and compressed to have a thickness of 1.5 mm using a 1.5-mm spacer, and was allowed to stand in the compressed state in an oven at a temperature of 150° C. for 24 hours. After 24 hours, the sheet was taken out and immediately released from the compression, and was allowed to stand at room temperature for 1 hour, after which the thickness of the sheet was measured and the resilience rate was measured using the following formula.

Resilience rate (%)=[(L2−L1)/(L3−L1)]×100 where L1: spacer thickness (1.5 mm), L2: sample thickness after test, L3: sample thickness before test <Thermal Conductivity>

Figure 1B:
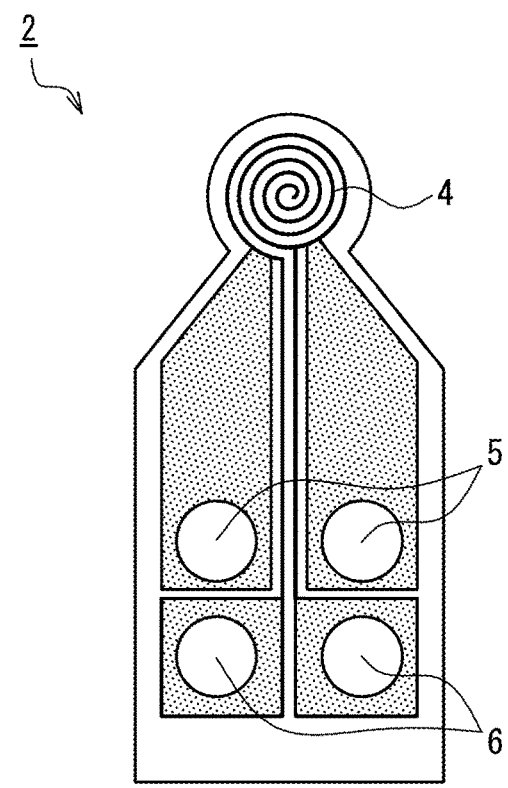

The thermal conductivity was measured by the hot disc method (as defined in ISO/CD 22007-2). In a thermal conductivity measuring apparatus 1, as shown in FIG. 1A, a sensor 2 made of a polyimide film was sandwiched between two samples 3a and 3b, a constant power was applied to the sensor 2 to constantly generate heat, and the thermal properties were analyzed from an increase in the temperature of the sensor 2. In the sensor 2, an end 4 has a diameter of 7 mm and has a double spiral structure of electrodes as shown in FIG. 1B, and a lower portion thereof has a current application electrode 5 and a resistance value electrode (temperature measurement electrode) 6. The thermal conductivity was calculated using the following formula (Formula 1).

$$\lambda = \frac{Po \cdot D(\tau)}{\pi^{3/2} \cdot r} \cdot \frac{D(\tau)}{\Delta T(\tau)} \quad (1)$$

$\lambda$ : Thermal conductivity $(W/m-K)$ $Po$ : Constant power $(W)$ $r$ : Sensor radius (m)

$\tau : \sqrt{\alpha \cdot t/r^2}$ $\alpha$ : Thermal diffusion rate of sample $(m^2/s)$ $t$ : Measurement time (s)

$D(\tau)$ : Function of nondimensionalized $\tau$ $\Delta T(\tau)$ : Increase in sensor temperature $(K)$ Examples 1 to 4 and Comparative Examples 1 to 5

1. Material Components (1) A component (i) Linear dimethylpolysiloxane having one vinyl group at each terminal end of the molecular chain and a kinematic viscosity of 350 mm²/s (ii) Linear dimethylpolysiloxane having one vinyl group at each terminal end of the molecular chain and a kinematic viscosity of 3500 mm²/s (2) B component (i) Linear organopolysiloxane having three or more Si—H groups in one molecule, an Si—H group content of 0.67 mol/kg, and a kinematic viscosity of 850 mm²/s (ii) Linear organopolysiloxane having three or more Si—H groups in one molecule, an Si—H group content of 0.1 mol/kg, and a kinematic viscosity of 6300 mm²/s (iii) Linear organopolysiloxane having three or more Si—H groups in one molecule, an Si—H group content of 6.86 mol/kg, and a kinematic viscosity of 20 mm²/s (3) C component (catalyst)

A commercially available platinum catalyst was used.

(4) Ethynylcyclohexanol was used as a curing retarder.

(5) D component (thermally-conductive filler)

(i) As the D1 component, spherical alumina with an average particle size D50 of 2 μm and a specific surface area of 1.3 m²/g was used. As the surface treating agent, the following alkyltrialkoxysilane was added to 100 g of spherical alumina in an amount calculated using the following formula.

Addition amount (g)=1.3×100/(6.02×10²³×13×10⁻²⁰/
molecular weight of surface treatment agent)

S1: n-decyltrimethoxysilane (an alkyl group with 10 carbon atoms)

S2: n-dodecyltrimethoxysilane (an alkyl group with 12 carbon atoms)

S3: n-octadecyltrimethoxysilane (an alkyl group with 18 carbon atoms)

S4: n-propyltrimethoxysilane (an alkyl group with 3 carbon atoms)

(ii) As the D2 component, spherical alumina with an average particle size D50 of 35 μm was used.

(iii) As the D2 component, spherical alumina with an average particle size D50 of 75 μm was used.

The average particle size is D50 (median size) of the cumulative particle size distribution based on the volume in the particle size distribution measurement by the laser diffraction light scattering method. As a measuring instrument, for example, a laser diffraction/scattering particle size distribution analyzer LA-950S2 manufactured by HORIBA, Ltd. can be used.

2. Mixing, Forming, and Curing Method

The above-described components were mixed, and sandwiched and rolled between PET films to have a thickness of 3.0 mm, and thus the mixture was formed into a sheet, and cured at a temperature of 100° C. for 10 minutes.

The thus obtained cured sheet was evaluated.

TABLE 1

|  | Ex. 1 | Ex. 2 | Ex. 3 | Ex. 4 |
|---|---|---|---|---|
| A compoenent: kinematic viscosity 350 mm²/s (g) | 93.46 | 71.43 | 93.46 | 66.67 |
| A compoenent: kinematic viscosity 3500 mm²/s (g) | — | — | — | — |
| B component: Si—H content 0.67 mol/kg (g) | 6.54 | — | 6.54 | — |
| B component: Si—H content 0.1 mol/kg (g) | — | 28.57 | — | 33.33 |
| B component: Si—H content 6.86 mol/kg (g) | — | — | — | — |
| C component: platinum catalyst (g) | 0.30 | 0.30 | 0.30 | 0.30 |
| Curing retarder (g) | 0.02 | 0.02 | 0.02 | 0.02 |
| D1 compoenent: spherical alumina, D50 = 2 μm (g) | 150 | 150 | 150 | 100 |
| D2 compoenent: spherical alumina, D50 = 35 μm (g) | 300 | 300 | 300 | 200 |
| D2 compoenent: spherical alumina, D50 = 75 μm (g) | 300 | 300 | 300 | 200 |
| D1 + 2: total amount (g) | 750 | 750 | 750 | 500 |
| Surface treating agent of D1 | S1 | S1 | S2 | S1 |
| Proportion of number of Si—H groups/vinyl groups | 0.36 | 0.30 | 0.36 | 0.38 |
| Hardness (Asker C) | 18 | 17 | 17 | 20 |
| Resilience rate (%) | 33 | 23 | 27 | 77 |
| Thermal conductivity (W/m · K) | 2.0 | 2.0 | 2.0 | 1.3 |
| Foaming on surface after curing | Not occurred | Not occurred | Not occurred | Not occurred |

TABLE 2

|  | Com. Ex. 1 | Com. Ex. 2 | Com. Ex. 3 | Com. Ex. 4 | Com. Ex. 5 |
|---|---|---|---|---|---|
| A content: kinematic viscosity 350 mm²/s (g) | — | 90.91 | 93.46 | 93.46 | 99.35 |
| A content: kinematic viscosity 3500 mm²/s (g) | 84.75 | — | — | — | — |
| B content: Si—H content 0.67 mol/kg (g) | — | 9.09 | 6.54 | 6.54 | — |
| B content: Si—H content 0.1 mol/kg (g) | 15.25 | — | — | — | — |
| B content: Si—H content 6.86 mol/kg (g) | — | — | — | — | 0.65 |
| C content: platinum catalyst (g) | 0.30 | 0.30 | 0.30 | 0.30 | 0.30 |
| Curing retarder (g) | 0.02 | 0.02 | 0.02 | 0.02 | 0.02 |
| D1 content: spherical alumina, D50 = 2 μm (g) | 150 | 150 | 150 | 150 | 150 |
| D2 content: spherical alumina, D50 = 35 μm (g) | 300 | 300 | 300 | 300 | 300 |
| D2 content: spherical alumina, D50 = 75 μm (g) | 300 | 300 | 300 | 300 | 300 |
| D1 + 2: total amount (g) | 750 | 750 | 750 | 750 | 750 |
| Surface treating agent of D1 | S1 | S1 | S3 | S4 | S1 |
| Proportion of number of Si—H groups/vinyl groups | 0.36 | 0.52 | 0.36 | 0.36 | 0.36 |
| Hardness (Asker C) | 14 | 46 | 16 | 33 | 17 |
| Resilience rate (%) | 7 | 48 | 29 | 11 | 15 |
| Thermal conductivity (W/m · K) | 2.0 | 2.0 | 2.0 | 2.0 | 2.0 |
| Foaming on surface after curing | Not occurred | Not occurred | Occurred | Not occurred | Not occurred |

From these results, the following facts can be seen.

(1) In Example 1, the Si—H content was 0.67 mol/kg, and the resilience rate was good.

(2) In Example 2, the Si—H content was 0.1 mol/kg, and the resilience rate was good.

(3) Example 3 was different from Example 1 in that the surface treatment agent was dodecyltrimethoxysilane, but the resilience rate was good.

(4) In Example 4, since the amount of the thermally-conductive filler added was smaller than that in Examples 1 to 3, the resilience rate was higher than that in Examples 1 to 3.

(5) In Comparative Example 1, as a result of using linear organopolysiloxane having a vinyl group at each terminal end with high kinematic viscosity, the resilience rate deteriorated.

(6) In Comparative Example 2, the proportion of the number of Si—H groups/vinyl groups was 0.52, and the hardness increased.

(7) In Comparative Example 3, since the surface treatment agent was octadecyltrimethoxysilane, there was a problem of surface foaming during curing.

(8) In Comparative Example 4, since the surface treatment agent was propyltrimethoxysilane, the hardness increased and the resilience rate was poor.

(9) In Comparative Example 5, the Si—H content was 6.86 mol/kg, and the resilience rate was poor.

As described above, it was confirmed that Examples 1 to 4 can realize flexibility and high resilience.

INDUSTRIAL APPLICABILITY

The thermally-conductive silicone gel composition of the present invention and the sheet using the same are suitably interposed between a heat generating portion and a heat dissipating member in an electric/electronic component or the like.

LIST OF REFERENCE NUMERALS

1 Thermal conductivity measuring apparatus
2 Sensor
3a, 3b Sample
4 End of sensor
5 Current application electrode
6 Resistance value electrode (temperature measurement electrode)

The invention claimed is:

1. A thermally-conductive silicone gel composition comprising:

A a linear organopolysiloxane having one vinyl group at each terminal end of a molecular chain and a kinematic viscosity of 1 to 600 mm$^2$/s;

B a linear organopolysiloxane having three or more Si—H groups in one molecule and an Si—H group content of 0.05 to 2 mol/kg, in an amount such that a ratio of the number of Si—H groups in B component to the number of vinyl groups in A component is 0.3 to 0.4;

C a platinum group metal-based catalyst in a catalytic amount; and

D a thermally-conductive filler in an amount of 300 to 1000 parts by mass when a total amount of A and B is taken as 100 parts by mass, including D1 50 to 400 parts by mass of at least one type of spherical alumina with an average particle size of 1 to 5 μm, a part or a whole of the alumina being surface-treated with $R_a Si(OR')_{4-a}$, where R represents an unsubstituted or substituted organic group having 8 to 12 carbon atoms, R' represents an alkyl group having 1 to 4 carbon atoms, and a is 1, and D2 100 to 950 parts by mass of at least one type of spherical alumina with an average particle size of 10 to 100 μm.

2. The thermally-conductive silicone gel composition according to claim 1, wherein the linear organopolysiloxane of the B component has a kinematic viscosity of 1 to 10000 mm$^2$/s.

3. The thermally-conductive silicone gel composition according to claim 1, wherein the D2 component is contained in an amount of 200 to 500 parts by mass with respect to 100 parts by mass of the D1 component.

4. The thermally-conductive silicone gel composition according to claim 1, wherein the spherical alumina of the D2 includes at least two types of alumina including spherical alumina with an average particle size of 10 μm or more and less than 50 μm and spherical alumina with an average particle size of 50 μm or more and 100 μm or less.

5. A thermally-conductive silicone gel sheet obtained by curing the thermally-conductive silicone gel composition according to claim 1, the sheet having a thermal conductivity of 1 W/m·K or more, an Asker C hardness of 30 or less, and a resilience rate of 20% or more.

6. The thermally-conductive silicone gel sheet according to claim 5, wherein foaming is not seen by visual observation.

7. A method for producing a thermally-conductive silicone gel sheet comprising uniformly mixing a composition containing A to D components below, forming the mixture into a sheet, and curing the sheet by heat:

A a linear organopolysiloxane having one vinyl group at each terminal end of a molecular chain and a kinematic viscosity of 1 to 600 mm$^2$/s;

B a linear organopolysiloxane having three or more Si—H groups in one molecule and an Si—H group content of 0.05 to 2 mol/kg, in an amount such that a ratio of the number of Si—H groups in B component to the number of vinyl groups in A component is 0.3 to 0.4;

C a platinum group metal-based catalyst in a catalytic amount; and

D a thermally-conductive filler in an amount of 300 to 1000 parts by mass when a total amount of A and B is taken as 100 parts by mass, including D1 50 to 400 parts by mass of at least one type of spherical alumina with an average particle size of 1 to 5 μm, a part or a whole of the alumina being surface-treated with $R_a Si(OR')_{4-a}$, where R represents an unsubstituted or substituted organic group having 8 to 12 carbon atoms, R' represents an alkyl group having 1 to 4 carbon atoms, and a is 1, and D2 100 to 950 parts by mass of at least one type of spherical alumina with an average particle size of 10 to 100 μm.

8. The method for producing a thermally-conductive silicone gel sheet according to claim 7, wherein the linear organopolysiloxane of the B component has a kinematic viscosity of 1 to 10000 mm$^2$/s.

9. The method for producing a thermally-conductive silicone gel sheet according to claim 7, wherein the D2 component is contained in an amount of 200 to 500 parts by mass with respect to 100 parts by mass of the D1 component.

10. The method for producing a thermally-conductive silicone gel sheet according to claim 7, wherein the spherical alumina of the D2 includes at least two types of alumina including spherical alumina with an average particle size of 10 μm or more and less than 50 μm and spherical alumina with an average particle size of 50 μm or more and 100 μm or less.

* * * * *